United States Patent
Ramani et al.

(10) Patent No.: US 7,122,170 B2
(45) Date of Patent: *Oct. 17, 2006

(54) CATALYSTS FOR SPOC™ ENHANCED SYNTHESIS GAS PRODUCTION

(75) Inventors: Sriram Ramani, Ponca City, OK (US); Alfred E. Keller, Ponca City, OK (US)

(73) Assignee: Conocophillips Company, Houston, TX (US)

( * ) Notice: Subject to any disclaimer, the term of this patent is extended or adjusted under 35 U.S.C. 154(b) by 512 days.

This patent is subject to a terminal disclaimer.

(21) Appl. No.: 10/317,936

(22) Filed: Dec. 12, 2002

(65) Prior Publication Data

US 2003/0129123 A1    Jul. 10, 2003

Related U.S. Application Data

(63) Continuation-in-part of application No. 09/742,999, filed on Dec. 20, 2000, now Pat. No. 6,579,510, and a continuation-in-part of application No. 09/625,710, filed on Jul. 25, 2000, now abandoned.

(60) Provisional application No. 60/341,730, filed on Dec. 18, 2001.

(51) Int. Cl.
| | |
|---|---|
| *C01B 3/00* | (2006.01) |
| *C01B 3/36* | (2006.01) |
| *C01B 17/04* | (2006.01) |
| *B01J 12/00* | (2006.01) |
| *B01J 19/00* | (2006.01) |

(52) U.S. Cl. ............... 423/650; 423/418.2; 423/573.1; 423/576.8; 423/651; 422/129; 422/179; 422/180; 422/183; 252/373

(58) Field of Classification Search ............. 423/245.1, 423/418.2, 573.1, 576.2, 576.8, 648.1, 650, 423/651; 252/373; 422/129, 179, 180, 181, 422/182, 183, 190, 192
See application file for complete search history.

(56) References Cited

U.S. PATENT DOCUMENTS

| | | | |
|---|---|---|---|
| 2,963,348 A | 12/1960 | Sellers | 23/225 |
| 4,038,036 A | 7/1977 | Beavon | 23/262 |
| 4,279,882 A | 7/1981 | Beavon | 423/574 |
| 4,311,683 A | 1/1982 | Hass et al. | 423/573 |
| 4,406,873 A | 9/1983 | Beavon | 423/574 |
| 4,481,181 A | 11/1984 | Norman | 423/573 |

(Continued)

FOREIGN PATENT DOCUMENTS

EP    0 303 438    8/1988

(Continued)

OTHER PUBLICATIONS

D.A. Hickman et al., "Synthesis Gas Formation by Direct Oxidation of Methane over Pt Monoliths," J. Catalysis 138, 267-282 (1992).

(Continued)

*Primary Examiner*—Timothy C. Vanoy
(74) *Attorney, Agent, or Firm*—Conley Rose PC

(57) ABSTRACT

A process and system for producing synthesis gas by a SPOC® enhanced catalytic partial oxidation process is disclosed. Light hydrocarbons in a $H_2S$-containing feed gas are partially oxidized to produce hydrogen and carbon monoxide over a catalyst that simultaneously oxidizes the $H_2S$ to produce elemental sulfur. A reaction in which $H_2S$ is partially oxidized to elemental sulfur and water takes place instead of a secondary reaction in which a portion of the light hydrocarbon feed is combusted to form $CO_2$ and water. An increase in yield and selectivity for CO and $H_2$ products results, and readily recoverable elemental sulfur is also produced.

35 Claims, 2 Drawing Sheets

U.S. PATENT DOCUMENTS

| | | | | |
|---|---|---|---|---|
| 4,797,268 | A | 1/1989 | McGovern et al. | 423/574 |
| 4,857,297 | A | 8/1989 | Kettner et al. | 423/576.8 |
| 4,863,707 | A * | 9/1989 | McShea et al. | 423/359 |
| 4,877,550 | A | 10/1989 | Goetsch et al. | 252/373 |
| 4,886,649 | A | 12/1989 | Ismagilov et al. | 423/230 |
| 4,889,701 | A | 12/1989 | Jones et al. | 423/220 |
| 4,891,187 | A | 1/1990 | Jungfer et al. | 423/248 |
| 4,988,494 | A | 1/1991 | Lagas et al. | 423/574 |
| 5,232,467 | A | 8/1993 | Child et al. | 48/127.3 |
| 5,397,556 | A | 3/1995 | Towler et al. | 423/220 |
| 5,472,920 | A | 12/1995 | Dubois et al. | 501/103 |
| 5,512,260 | A | 4/1996 | Kiliany et al. | 423/242.1 |
| 5,597,546 | A | 1/1997 | Li et al. | 423/573.1 |
| 5,603,913 | A | 2/1997 | Alkhazov et al. | 423/576.8 |
| 5,639,929 | A | 6/1997 | Bharadwaj et al. | 585/658 |
| 5,648,582 | A | 7/1997 | Schmidt et al. | 585/652 |
| 5,653,953 | A | 8/1997 | Li et al. | 423/576.8 |
| 5,654,491 | A | 8/1997 | Goetsch et al. | 568/469.9 |
| 5,676,921 | A | 10/1997 | Heisel et al. | 423/573.1 |
| 5,700,440 | A | 12/1997 | Li et al. | 423/230 |
| 5,720,901 | A | 2/1998 | De Jong et al. | 252/373 |
| 5,807,410 | A | 9/1998 | Borsboom et al. | 23/293 |
| 5,814,293 | A | 9/1998 | Terorde et al. | 423/576 |
| 5,882,614 | A | 3/1999 | Taylor et al. | 423/230 |
| 5,891,415 | A | 4/1999 | Alkhazov et al. | 423/573.1 |
| 5,897,850 | A | 4/1999 | Borsboom et al. | 423/576.2 |
| 5,965,100 | A | 10/1999 | Khanmamedov | 423/576.8 |
| 6,017,507 | A | 1/2000 | Nougayrede et al. | 423/573.1 |
| 6,083,471 | A | 7/2000 | Philippe et al. | 423/573.1 |
| 6,099,819 | A | 8/2000 | Srinivas et al. | 423/573.1 |
| 6,103,206 | A | 8/2000 | Taylor, Jr. et al. | 423/210 |
| 6,103,773 | A | 8/2000 | Wittenbrink et al. | 518/702 |
| 6,221,280 | B1 | 4/2001 | Anumakonda et al. | 252/372 |
| 6,402,989 | B1 | 6/2002 | Gaffney | 252/373 |
| 6,403,051 | B1 | 6/2002 | Keller | 423/523.1 |
| 6,409,940 | B1 | 6/2002 | Gaffney et al. | 252/373 |
| 6,447,745 | B1 | 9/2002 | Feeley et al. | 423/648.1 |
| 6,488,838 | B1 | 12/2002 | Tonkovich et al. | |
| 6,579,510 | B1 * | 6/2003 | Keller et al. | 423/573.1 |
| 6,616,909 | B1 | 9/2003 | Tonkovich et al. | |
| 6,746,458 | B1 * | 6/2004 | Cloud | 606/151 |
| 6,800,269 | B1 * | 10/2004 | Keller et al. | 423/576.2 |
| 2005/0112047 | A1 * | 5/2005 | Allison et al. | 423/418.2 |

FOREIGN PATENT DOCUMENTS

| | | |
|---|---|---|
| FR | 2702675 A1 | 3/1993 |
| RU | 2023655 C1 | 11/1994 |
| WO | WO 01/09032 A1 | 2/2001 |
| WO | WO 01/81241 | 11/2001 |

OTHER PUBLICATIONS

J.A. Moulijn, Structured Catalysts and Reactors, (Eds.), Marcel Dekker, Inc. (1998) Ch. 21, X. Xu and J.A. Moulijn, "Transformation of a Structured Carrier into Structured Catalyst," p. 599-615.

S.C. Tsang et al., "Recent advances in the conversion of methane to synthesis gas," Catalysis Today 23, 3-15 (1995).

M.E.D. Raymont, *Role of hydrogen in Claus plants*, Hydrocarbon Processing, 177-179 (1975).

Richard K. Kerr, et al, *A new sulfur-recovery process: The RSRP*, Oil & Gas Journal 230-243 (1982).

M.E.D. Raymont, *Make hydrogen from hydrogen sulfide*, Hydrocarbon Processing, 139-142 (1975).

R.H. Hass, et al, *Process meets sulfur recovery needs*, Hydrocarbon Processing 104-107 (1981).

J.A. Lagas, et al, *Selective-oxidation catalyst improves Claus process*, Oil & Gas Journal, 68-71 (1988).

Z.R. Ismagilov, et al, *New Catalysts and Processes For Environment Protection*, React. Kinet. Catal. Lett., vol. 55, No. 2, 489-499 (1995).

Kuo-Tseng Li and Ni-Shen Shyu, *Catalytic Oxidation of Hydrogen Sulfide to Sulfur on Vanadium Antimonate*, Ind. Eng. Chem. Res. 1480-1484, vol. 36, No. 5 (1997).

J. B. Hyne, *Methods for desulfurization of effluent gas streams*, The Oil & Gas Journal, 64-78 (1972).

B. Gene Goar, *Today's Sulfur Recovery Processes*, Hydrocarbon Processing vol. 47, No. 9, 248-252 (1968).

R. Gene Goar, *First Recycle Selectox unit onstream*, Oil & Gas Journal, 124-125 (1982).

Sung Woo Chun, et al, *Selective oxidation of H2S to elemental sulfur over $TiO_2/SiO_2$ catalysts,* Applied Catalysis B: Environmental 16, 235-243 (1998).

H. Austin Taylor and Charles F. Pickett, *The Decomposition of Hydrogen Sulphide*, Journal of Physical Chemistry, vol. 31, pp. 1212-1219 (1927).

J. Chao, *Properties of Elemental Sulfur*, Hydrocarbon Processing, 217-223, (1980).

David M. Haaland, *Noncatalytic Electrodes for Solid-Electrolyte Oxygen Sensors*, J. Electrochem. Soc.: Electrochemical Science and Technology, vol. 127, No. 4, 796-804 (1980).

J.W. Mellor, *A Comprehensive Treatise on Inorganic and Theoretical Chemistry,* vol. X, Longmans, Green and Co., New York, 118-119, 128-129, 206-213,221-223,144-148,152-159,162-166,393-400 (1947).

PCT Search Report in PCT/US00/40489, International Filing Date: Jul. 26, 2000.

PCT Search Report in PCT/US00/20252, International Filing Date: Jul. 26, 2000.

PCT Search Report in PCT/US00/34692.

Arthur L. Kohl and Fred C. Riesenfeld, *Gas Purification, Fourth Edition*, Gulf Publishing Company, Library of Congress Cataloging in Publication Data, TP7545K6, 1985, 665.7, 85-4148, ISBN 0-87201-314-6, pp. 457-460.

PCT/US02/39794—PCT Search Report dated May 30, 2003—.

* cited by examiner

CATALYSTS FOR SPOC™ ENHANCED SYNTHESIS GAS PRODUCTION

CROSS-REFERENCE TO RELATED APPLICATIONS

This application claims the benefit under 35 U.S.C. 119(e) of U.S. Provisional Patent Application 60/341,730 filed Dec. 18, 2001, and is a continuation-in-part of U.S. patent application Ser. No. 09/625,710 filed Jul. 25, 2000, now abandoned and is a continuation-in-part of U.S. patent application Ser. No. 09/742,999 filed Dec. 20, 2000, now U.S. Pat. No. 6,579,510 the disclosures of which are hereby incorporated herein by reference.

BACKGROUND OF THE INVENTION

1. Technical Field of the Invention

The present invention generally relates to catalysts, processes and apparatus for producing synthesis gas from light hydrocarbons. More particularly, the invention pertains to catalysts that are active for catalyzing the selective partial oxidation of light hydrocarbons (e.g., methane or natural gas) to products containing CO and $H_2$ and the concurrent catalytic partial oxidation of $H_2S$ to elemental sulfur and water, and to methods and apparatus employing such catalysts for enhancement of syngas production.

2. Description of Related Art

Many refineries face an abundant supply of lower alkanes, i.e., $C_1$–$C_4$ alkanes such as methane, and relatively few means of converting them to more valuable products. Moreover, vast reserves of methane, the main component of natural gas, are available in many areas of the world, and natural gas is predicted to outlast oil reserves by a significant margin. There is great incentive to exploit these natural gas formations, however most natural gas formations are situated in areas that are geographically remote from population and industrial centers. The costs of compression, transportation, and storage make its use economically unattractive. To improve the economics of natural gas use, much research has focused on methane as a starting material for the production of higher hydrocarbons and hydrocarbon liquids, which are more easily transported than syngas.

The conversion of methane to higher hydrocarbons is typically carried out in two steps. In the first step, methane is reformed with water to produce a mixture of carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes. Syngas generation from methane typically takes place by one of three techniques. Steam reforming of methane is the most common, followed by partial oxidation, and autothermal reforming.

The partial oxidation of methane can be represented by the reaction shown in equation (1):

$$CH_4 + \tfrac{1}{2}O_2 \rightarrow CO + 2H_2 \quad (1)$$

At the same time, some of the methane burns completely, according to equation (2):

$$CH_4 + 2O_2 \rightarrow CO_2 + 2H_2O \quad (2)$$

Hence, syngas is typically a mixture of carbon monoxide and molecular hydrogen, generally having a hydrogen to carbon monoxide molar ratio in the range of 1:5 to 5:1, and may contain other gases such as carbon dioxide. Synthesis gas is not usually considered a commodity; instead, it is typically generated on-site for further processing. Synthesis gas is commonly used as a feedstock for conversion to alcohols (e.g., methanol), olefins, or saturated hydrocarbons (paraffins) according to the well-known Fischer-Tropsch process, and by other means. The resulting high molecular weight (e.g. $C_{50+}$) paraffins, in turn, provide an ideal feedstock for hydrocracking, a feedstock for conversion to high quality jet fuel, and superior high octane value diesel fuel blending components.

Emerging technologies that have been developed to generate syngas from methane include a technique that entails exposing a mixture of methane and oxygen to a hot catalyst for a brief time, typically on the order of milliseconds, followed by cooling of the resultant gas stream. EPO Patent No. 303,438 describes a process for synthesis gas production by catalytic partial oxidation to overcome some of the disadvantages and costs of steam reforming. A monolith catalyst is used with or without metal addition to the surface of the monolith and the process operates at space velocities of 20,000–500,000 $hr^{-1}$. Conventional catalytic partial oxidation processes are also described, for example, in U.S. Pat. Nos. 5,654,491, 5,639,929, 5,648,582 and in *J. Catalysis* 138, 267–282 (1992), the disclosures of which are incorporated herein by reference. Although in conventional short contact time syngas generation systems the syngas reaction can be self-sustaining once initiated, it has been shown that 10–15% of the carbon initially present as methane can be lost to the formation of $CO_2$ in combustion via equation (2), above. This directly reduces the yield of syngas that can be obtained. Therefore it is desirable to use a syngas generation system that allows a better yield of carbon monoxide and hydrogen.

Further complicating the exploitation of the world's natural gas supply is the fact that many natural gas formations contain $H_2S$ in concentrations ranging from trace amounts up to about 3–25% (by volume) hydrogen sulfide. For example, many of the catalysts that are conventionally used for the production of synthesis gas are poisoned by the presence of sulfur.

If the hydrocarbon conversion does proceed to some degree, the syngas product is typically contaminated by passed through $H_2S$ and/or $SO_2$. The presence of $H_2S$ or $SO_2$ generally diminishes the usefulness of the syngas or creates environmental safety concerns. It would be highly desirable in the natural gas exploitation industry to find a way to efficiently convert the light hydrocarbon content of the natural gas to synthesis gas without conducting an initial sulfur removal operation. In a related aspect of petroleum refining, some petroleum feed streams and separated fractions contain sulfur. Sulfur is typically undesirable in most petroleum refining processes and products. Refineries typically upgrade the quality of the various petroleum fractions by removing the sulfur before they are processed further. Hydrodesulfurization units are used to break down the sulfur compounds in the petroleum fractions and convert the sulfur to $H_2S$. In addition to hydrodesulfurization processes, other conversion processes in a typical refinery, such as fluid catalytic cracking, coking, visbreaking, and thermal cracking, produce $H_2S$ from sulfur containing petroleum fractions. The $H_2S$ from both the desulfurization processes and these conversion processes is typically removed from the gas streams or light liquid hydrocarbon streams using either chemical solvents based on alkanolamine chemistry or physical solvents. A circulating, regenerative $H_2S$ removal system employing an absorption stage for $H_2S$ pickup and a regeneration stage for $H_2S$ rejection produces a concentrated stream of $H_2S$.

In conventional systems, this $H_2S$ stream is then fed to a $H_2S$ conversion unit, which converts the $H_2S$ into a storable, saleable product such as elemental sulfur, sodium hydrosulfide solution, or sulfuric acid. Conversion of the $H_2S$ to elemental sulfur is most common, mainly because elemental sulfur is the most marketable sulfur compound of those typically produced.

The process most commonly used to recover elemental sulfur from $H_2S$ gas is the modified Claus sulfur recovery process. The conventional Claus process is well known in the art, and is also described in U.S. patent application Ser. No. 09/624,715, now U.S. Pat. No. 6,403,051 the disclosure of which is incorporated herein by reference.

U.S. Pat. No. 5,720,901 describes a process for the catalytic partial oxidation of hydrocarbons in which nitrogen is present in the hydrocarbon feed mixture. An organic or inorganic sulfur-containing compound is present in the feed mixture in a sufficient concentration (i.e., 0.05 to 100 ppm) to reduce the presence of nitrogen by-products, particularly ammonia and hydrogen cyanide, in the products of the catalytic partial oxidation process. It is suggested that hydrocarbon feedstocks used directly from naturally occurring reservoirs in which the sulfur content is significantly above the stated low levels be subjected to a partial sulfur removal treatment before being employed in that process. A sulfur removal step is applied to the product stream if the carbon monoxide and/or hydrogen products of the process are to be utilized in applications that are sensitive to the presence of sulfur, such as Fischer-Tropsch synthesis.

What is needed is a syngas production process than can avoid the need for an initial sulfur-removal step from $H_2S$-containing natural gas sources. The industry would also welcome a CPOX-based syngas production process that can avoid the undesirable side reaction by which a small but significant amount of the hydrocarbon is converted to $CO_2$, so that the yield and selectivity for CO and $H_2$ products could be improved. Also needed are new and better ways to utilize $H_2S$ gas streams arising from existing desulfurization processes.

BRIEF SUMMARY OF PREFERRED EMBODIMENTS

The present invention provides a method and catalysts that improve or enhance the yield of syngas generation and selectivity for CO and $H_2$ products, at least in part by substituting a $H_2S$ partial oxidation reaction for a methane combustion reaction in a syngas production process. Also provided is a reactor assembly or system for carrying out the method and which comprises a short contact time reactor and associated apparatus for handling process gases and the recovered sulfur. A feature of the preferred method is that the partial oxidation of $H_2S$ provides the heat necessary to sustain the syngas reaction at the desired temperature without consuming the methane or other light hydrocarbon. Hence, less hydrocarbon is lost to complete combustion, and the yield of the desired product is increased.

Accordingly, certain embodiments of the present invention provide a more efficient process for producing synthesis gas. The process comprises, contacting an $H_2S$-containing light hydrocarbon stream, in the presence of $O_2$, with a catalyst having activity for catalyzing the partial oxidation of the hydrocarbon to a product comprising CO and $H_2$ and also having activity for catalyzing the partial oxidation of $H_2S$ to elemental sulfur and water, under reaction promoting conditions of temperature, flow rate, molar ratios of reactant gases, and reactant gas/catalyst contact time. The process also includes maintaining the reaction promoting conditions such that the reactions

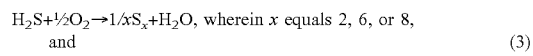

$$H_2S + \tfrac{1}{2}O_2 \rightarrow 1/xS_x + H_2O, \text{ wherein } x \text{ equals 2, 6, or 8,} \text{ and} \quad (3)$$

$$CH_4 + \tfrac{1}{2}O_2 \rightarrow CO + 2H_2 \quad (4)$$

simultaneously occur and a process gas stream is obtained comprising CO, $H_2$, gaseous elemental sulfur and steam. For simplicity, the reaction with $CH_4$, as a representative light hydrocarbon, is shown in Reaction 4. The process further comprises condensing elemental sulfur from the process gas stream to provide a substantially desulfurized synthesis gas stream. In preferred embodiments the process includes contacting the catalyst with a portion of the $H_2S$-containing light hydrocarbon stream for no more than about 100 milliseconds.

In some embodiments, a process for producing synthesis gas is provided that comprises providing a first gas stream containing a light hydrocarbon (i.e., $C_1$–$C_4$ or natural gas, which may contain a mixture of $C_1$–$C_4$ and sometimes a $C_5$ alkane) and, optionally, $H_2S$. In some embodiments, a second gas stream containing pure $H_2S$ is mixed with the first gas stream. Preferably conditions that promote or favor the simultaneous catalytic partial oxidation of hydrocarbon ("CPOX") and the catalytic partial oxidation of $H_2S$ ("SPOX") are maintained, also referred to as "reaction promoting conditions". Reaction promoting conditions may include regulating the composition of the $H_2S$-containing hydrocarbon feed gas stream so that the $H_2S$:$CH_4$ molar ratio of about 1:20 to about 2:3. Reaction promoting conditions preferably also include providing that the reactant gas mixture have a $CH_4$:$O_2$ molar ratio of about 1.5:1 to about 2.2:1. Passing the reactant gas stream over the catalyst at a flow rate in excess of 20,000 $hr^{-1}$, preferably more than 100,000 $hr^{-1}$, such that each portion of reactant gas mixture that contacts the catalyst resides or dwells on the catalytic material for no more than about 100 milliseconds. In some embodiments the contact time is under 50 milliseconds, and in some the contact time is less than 20 milliseconds. A contact time $\leq 10$ milliseconds occurs in certain embodiments. Choosing a catalyst that is active for catalyzing both the CPOX and SPOX reactions also favors the concurrent reactions. The selected catalyst is capable of catalyzing the partial oxidation of a light hydrocarbon to CO and $H_2$ and also capable of catalyzing the partial oxidation of $H_2S$ to elemental sulfur and water under favorable or reaction promoting conditions.

In preferred embodiments, the process includes maintaining reaction-promoting conditions of temperature, molar ratios of reactant gas components, and flow rate, as described above, such that a gaseous product stream comprising primarily CO, $H_2$, elemental sulfur and $H_2O$ is obtained. The gaseous product stream is then cooled to the condensation temperature of elemental sulfur, or lower, such that elemental sulfur condenses from the product stream and an at least partially desulfurized syngas product stream is obtained. As indicated by a particular need or use, elemental sulfur product may also be harvested. Any residual gaseous sulfur-containing components may be removed from the resulting at least partially desulfurized gaseous product stream. For this purpose, a conventional sulfur absorbing material such as zinc or iron oxide may be used. Substantially sulfur-free synthesis gas, preferably in high yield, having a $H_2$:CO molar ratio of about 2:1 and containing less than about 10 vol. % $CO_2$ is recovered from said product stream.

In some embodiments, the step of mixing a second gas stream comprising $H_2S$ with the first gas stream to form a feed gas stream is carried out at temperatures up to about 300° C. In some embodiments the step of contacting the feed gas stream with a hot catalyst to form a product stream is carried out at temperatures above 500° C., preferably between about 850° C. and about 1,500° C.

In some embodiments the method of improving syngas yield includes converting less than 10 vol. % of the light hydrocarbon to carbon dioxide. In preferred embodiments the catalyst contact time is less than 100 milliseconds. In some embodiments the contact time is even less, as described above.

According to some embodiments of the present invention, catalyst compositions are provided that are active for concurrently catalyzing the partial oxidation of a light hydrocarbon and for catalyzing the partial oxidation of $H_2S$, in the presence of $O_2$, to produce a product mixture comprising CO, $H_2$, elemental sulfur and $H_2O$. The preferred catalysts comprise at least one metal chosen from the group consisting of platinum, rhodium, ruthenium, iridium, nickel, palladium, iron, cobalt, rhenium and rubidium. In some embodiments the catalyst includes a lanthanide element, which may be in the form of the oxide, and the catalytic components may be carried on a refractory support. In a highly preferred embodiment, the catalyst comprises a Pt—Rh alloy deposited on a samarium oxide coated or modified refractory support, such as alpha-alumina or partially stabilized (MgO) zirconia, for example.

In accordance with certain other embodiments of the present invention, a system or assembly for producing synthesis gas and concurrently recovering elemental sulfur is provided. In preferred embodiments the system includes a reactor having a light hydrocarbon inlet; an $H_2S$ inlet; an oxygen inlet; a mixing zone capable of receiving said light hydrocarbon, $H_2S$ and oxygen gases and forming a reactant gas mixture; a reaction zone capable of receiving said reactant gas mixture and containing a catalyst; and a reacted gas outlet. In preferred embodiments, the temperature of the mixing zone does not exceed about 300° C. when the system is in use for its intended purpose. Also, in the preferred embodiments, the temperature of the reaction zone is at least about 700° C. but does not exceed 1,500° C., and is more preferably 850° C.–1,300° C. A catalyst, as described above, that is capable of catalyzing the partial oxidation of said hydrocarbon to form CO and $H_2$ and capable of catalyzing the partial oxidation of said $H_2S$ to form elemental sulfur and water, at the same time, is contained in the reaction zone of the preferred embodiments.

These and other embodiments, features and advantages of the present invention will become apparent with reference to the following drawings and description.

BRIEF DESCRIPTION OF THE DRAWINGS

For a more detailed description of the present invention, reference will now be made to the accompanying drawings, wherein.

DETAILED DESCRIPTION OF PREFERRED EMBODIMENTS

Figure 1:
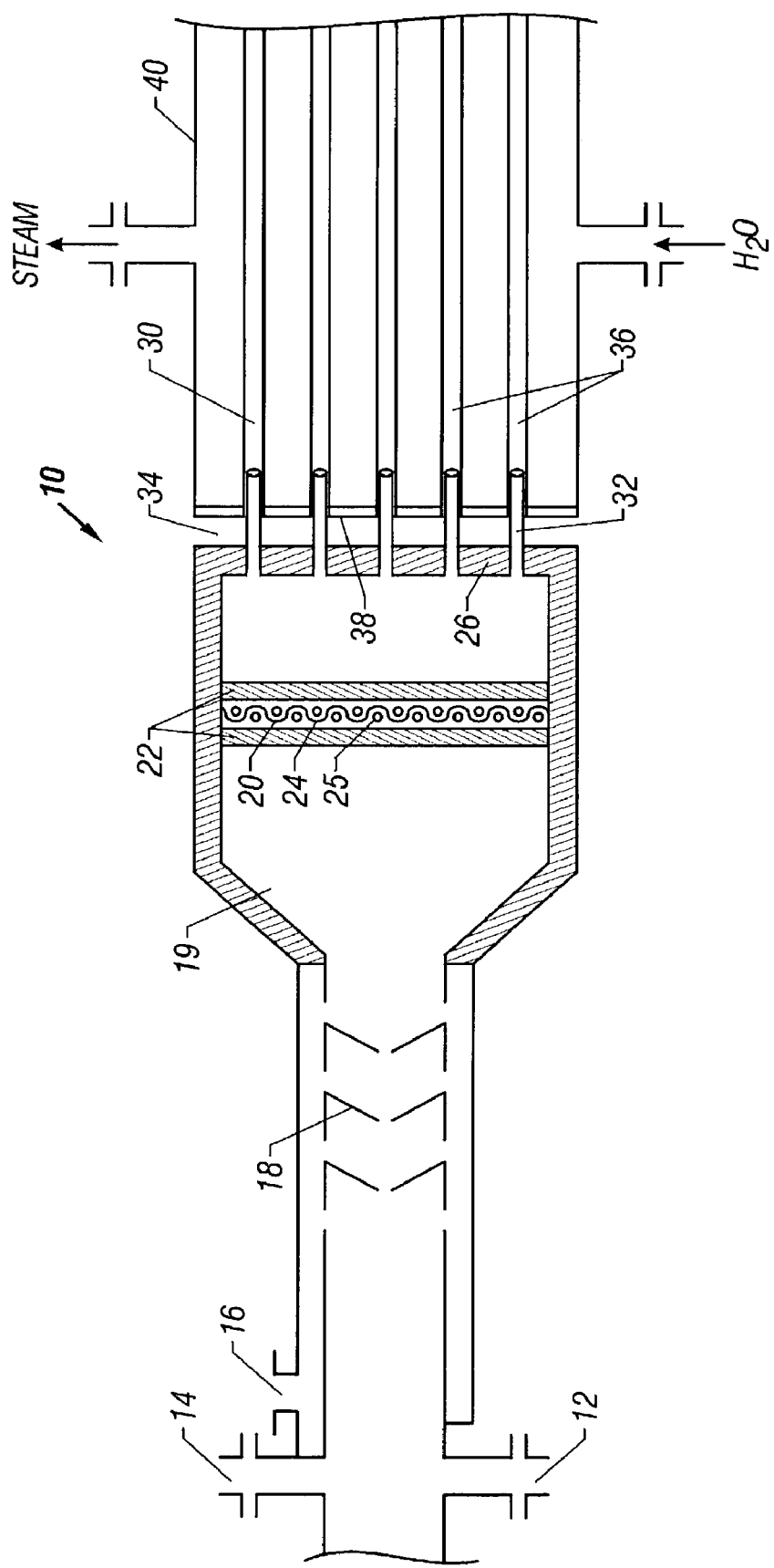
FIG. 1 is an enlarged cross-sectional view of a short contact time reactor and cooling zone constructed in accordance with a preferred embodiment of the present invention.
Figure 2:
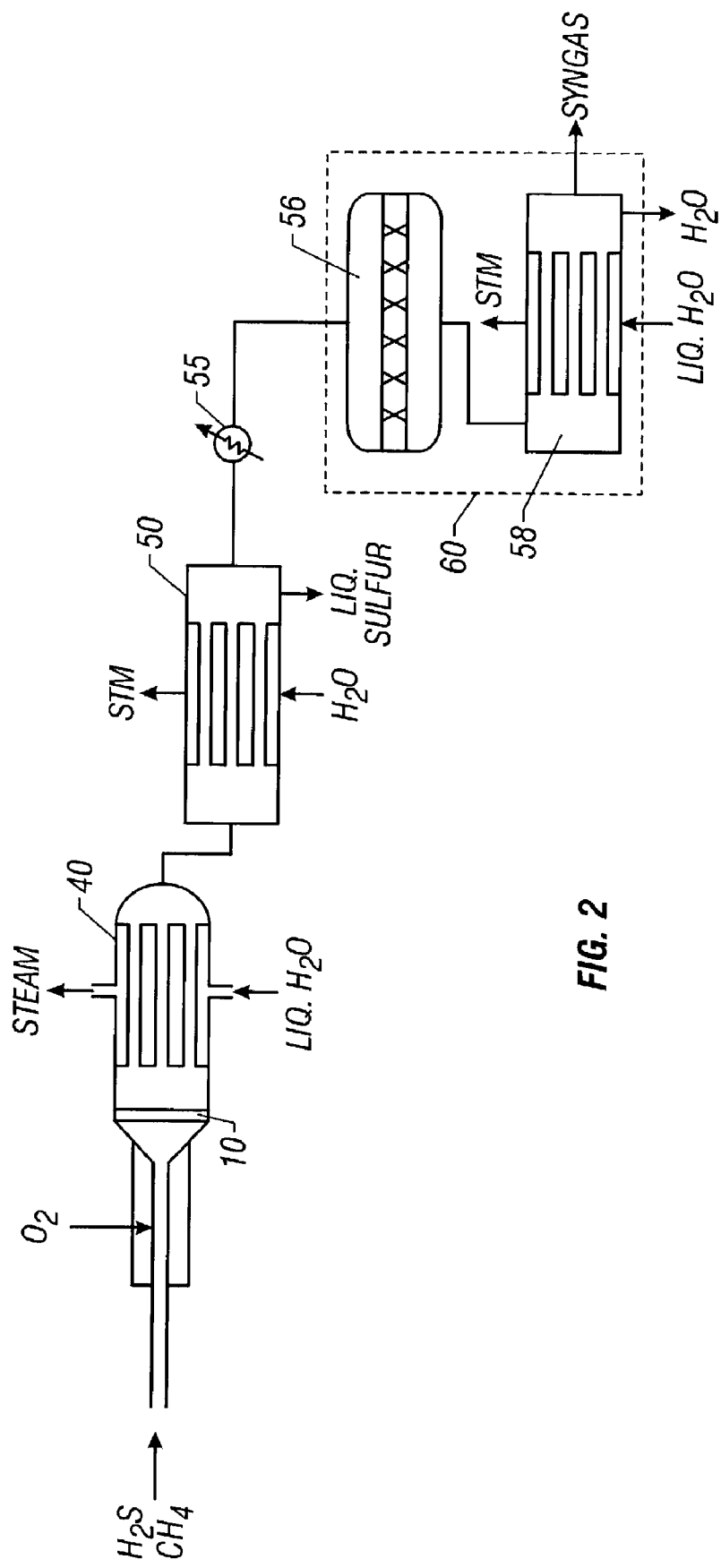
FIG. 2 is a schematic diagram of the components of one preferred embodiment of a syngas-elemental sulfur production system including the reactor of FIG. 1.

A process for the catalytic partial oxidization of $H_2S$ to elemental sulfur and water ("SPOC™") and the net catalytic partial oxidization ("CPOX") of a light hydrocarbon (such as methane or natural gas) to synthesis gas (a mixture of primarily CO and $H_2$) employs a very fast contact (i.e., less than 100 milliseconds)/fast quench (i.e., less than one second) reactor assembly, as shown in FIGS. 1 and 2. The term "SPOX," as used in this disclosure means "catalytic partial oxidation of $H_2S$," and the term "CPOX" refers to the "catalytic partial oxidation of light hydrocarbon." The term "SPOC™" refers to a process for producing elemental sulfur and water according to the SPOX reaction (equation 3, above) under reaction promoting conditions (e.g., temperature, reactant gas composition, flow rate, pressure), including a catalyst that is active and selective for the stated products. SPOX and CPOX reactions are carried out concurrently, over the same catalyst in the same reaction zone, in a syngas production assembly that employs a short contact time flow reactor that is capable of withstanding temperatures up to at least about 1,500° C. Without wishing to be bound by a particular theory, it is suggested that by substituting the heat of partial oxidation of $H_2S$ for the combustion of methane, which would otherwise typically occur as a side reaction in the CPOX process, the new syngas production process provides the heat necessary to maintain the syngas reaction at the desired temperature without giving up the methane to combustion products. This, in turn, results in a higher overall yield of syngas for the process.

Syngas Production Assembly

FIG. 1 is a cross-sectional view showing a preferred configuration of the interior of a millisecond contact time reactor 10, suitable for producing synthesis gas by partial oxidation of a light hydrocarbon and at the same time for producing gaseous elemental sulfur by the direct or selective partial oxidation of $H_2S$. Very generally described, the reactor is essentially a tube made of materials capable of withstanding the temperatures generated by the exothermic SPOX reaction set out in Reaction 3 and the temperatures produced by the exothermic CPOX reaction, illustrated in Reaction 4. Reactor 10 includes feed injection openings 12, 14, and 16, a mixing zone 19, a reaction zone 20 and a cooling zone 30. Reaction zone 20 preferably includes a thermal radiation shield or barrier 22 positioned immediately upstream of a catalytic device 24 in a fixed-bed configuration. Radiation barrier 22 is preferably a porous ceramic or refractory material that is suited to withstand the reactor operating temperatures and provide sufficient thermal insulation to the unreacted gases in the mixing zone 19. A second barrier 22 may be positioned on the downstream side of the catalyst to retain the catalyst bed and to thermally insulate the reacted gases entering cooling zone 30. Such refractory materials are well known in the art. In commercial scale operations the reactor may be constructed of, or lined with, any suitable refractory material that is capable of withstanding the temperatures generated by the exothermic CPOX and SPOX reactions.

The catalyst or catalyst device 24 is positioned in reaction zone 20 in the flow path of the feed gas mixture. Catalyst device 24 is preferably in the form of one or more layers of wire gauze, a porous ceramic monolith, or a bed of discrete or divided structures that is held between two porous refractory disks (radiation barriers 22). Suitable catalyst compositions are described in more detail below.

The reactor 10 of a preferred syngas production/sulfur recovery assembly also includes, adjacent reaction zone 20, a cooling zone 30 that includes ceramic ferrules 32 embedded in refractory material 26, and a tube sheet 34 containing a plurality of thermally conductive tubes 36. Tubes 36 of cooling zone 30 extend from the process (reacted) gas outlet of reactor 10 through a heat exchanger 40, such as a waste heat or fire tube boiler, as illustrated in FIG. 2, for cooling the reacted gases. Tube sheet 34 is a divider between the process gas and the boiling water where the hot process gas exits the reactor and enters boiler 40. The tubes 36 and tube sheet 34 are preferably made of carbon steel. The tube sheet forces the process gas to exit the reactor by going through the inside of tubes 36. Boiling water contained by the shell of the heat exchanger surrounds the outside of tubes 36. Since the carbon steel of the tubes and tube sheet cannot stand the high temperatures of the process gas (i.e., about 1,300° C.), temperature protection for the metal in both is needed. For tubes 36 and for most of the tube sheet 34, this protection is afforded by the boiling water. Since the boiling water remains at a constant temperature, and since the metal conducts heat so readily, the tubes and most of the tube sheet attain temperatures only slightly above the temperatures of the boiling water (i.e., about 100° C.). This is not the case for the portions of the tube sheet where tubes 36 connect at joints 38. Without thermal protection, these joints and the first part of the tube would see temperatures far exceeding the safe operating limits for the metal. The refractory covering 26 and ceramic ferrules (tube inserts) 32 provide insulation for these relatively unprotected areas of metal. Thus, only metal surfaces that are adequately exposed to the water jacket will encounter the hot gases.

Following boiler 40 is a sulfur condenser 50 for further cooling the process gas and providing for the removal of liquid sulfur product. In processes in which the cooled syngas mixture that emerges from condenser 50 still contains an undesirable amount of unreacted $H_2S$ or other sulfur-containing gas, the assembly may further include a heater 55 and at least one tail gas cleanup unit 60. Tail gas cleanup unit 60 includes a sulfur absorbing material 56 and another condenser 58. The sulfur absorbing material is preferably zinc or iron oxide. Additionally, a conventional quench tower may follow in line after the final tail gas cleanup unit if it is desired to remove the water from the gas exiting the CPOX/SPOX reactor.

Referring again to FIG. 1, the short contact time reactor portion of a syngas production/sulfur recovery assembly is preferably similar to those that are used for carrying out the catalytic partial oxidation (CPOX) of light hydrocarbons. Several schemes for carrying out catalytic partial oxidation (CPOX) of hydrocarbons in a short contact time reactor are well known and have been described in the literature. Short contact time syngas production reactors are described in co-owned U.S. Pat. No. 6,402,989, U.S. Pat. No. 6,409,940 and PCT International Publication No. WO 01/81241.

The catalyst device 24 is preferably in the form of one or more layers of wire gauze, a porous ceramic monolith, or a particle bed. For simplicity, a single gauze layer 25 is depicted in FIG. 1, however one can readily appreciate that a monolith or packed bed would be similarly located in the reactor. The catalyst device is configured so that only a first fraction of the feed gas mixture contacts the catalytically active surfaces of the catalyst device, while the balance of the reactant gas mixture serves to quickly cool the first fraction and prevent the oxidation reaction from proceeding too far. Preferably the catalyst bed or device 24 is held between two porous refractory disks 22, such as alpha-alumina, which also serve as thermal barriers (as discussed above). When a gauze is employed, it is preferably one or more layers of a substantially planar, flexible woven metal-containing or metal-coated screen or gauze having about 20–120 mesh. More preferably, it is a single gauze of metal wires, or a short stack of gauzes, of diameter compatible with the diameter of the reactor. In a laboratory scale reactor, the gauzes, monoliths or particle beds are preferably about 25 micrometers to about 12 millimeters in diameter. The catalyst device is preferably configured so that, as the stream of $H_2S$ and $O_2$ passes over the catalyst, only a first fraction of each portion of the gas mixture contacts the catalytically active surfaces of the catalyst device, while the balance of that portion of gas mixture serves to quickly cool the first fraction and prevent the oxidation reaction from proceeding too far.

CPOX/SPOC™ Catalysts

Catalysts (or "catalyst devices") that are active for catalyzing both the partial oxidation of $H_2S$ to elemental sulfur according to Reaction 3 and the partial oxidation of a light hydrocarbon to synthesis gas according to Reaction 4 (showing the representative methane reaction) are preferably in the form of one or more layers of wire gauze, one or more porous ceramic monolith, or a bed containing or one or more layers of discrete or divided structures. The catalyst device may be formed entirely of catalytic material, or it may comprise one or more catalytic components supported on a non-catalytic refractory support. Some suitable catalytic components that can be included in the metal of a gauze, or incorporated at its surface, or supported on a non-catalytic wire gauze, or other suitable refractory monolith or divided support, include platinum, rhodium, ruthenium, iridium, nickel, palladium, iron, cobalt, rhenium and rubidium, or a combination of any of those metals. Platinum or rhodium, or especially a platinum-rhodium alloy, are preferred metals. A lanthanide oxide promoter is included in some of the more preferred catalyst compositions. Other catalytically active metals that may be included in the catalyst are vanadium, bismuth and magnesium. Non-limiting examples of catalytic metals deposited on refractory oxide supports include Pd—$La_2O_3$, Pt/$ZrO_2$ and Pt/$Al_2O_3$.

Metal Gauzes. One type of catalyst is in the form of one or more layers of substantially planar, flexible woven metal-containing or metal-coated screen or gauze having about 20–120 mesh and diameter compatible with the inner diameter of the reactor. Suitable metals that may be formed into a gauze or deposited onto a non-catalytic gauze support include platinum, rhodium, ruthenium, iridium, nickel, palladium, iron, cobalt, rhenium and rubidium, or a mixture of any of those metals. Some of the more preferred gauze-type catalysts are made of about 87–93% by weight (wt %) Pt and about 7–13 wt % Rh (wt % based on total weight of the catalyst device). Alternative catalyst structures or devices may be in the form of one or more perforated disks, honeycomb-like structures, etched foils or any other suitably active structure that provides the desired gas flow rate to effect the desired partial oxidation.

Rh on a Ln-modified Refractory Support. Another type of catalyst that is active for catalyzing both the SPOX and CPOX reactions comprises about 0.005 to 25 wt % Rh, preferably 0.05 to 25 wt % Rh, and about 0.005 to 25 wt % of a lanthanide element (i.e., La, Ce, Pr, Nd, Pm, Sm, Eu, Gd, Th, Dy, Ho, Er, Tm, Yb and Lu), preferably samarium, ytterbium or praseodymium, in the form of the metal and/or metal oxide coating a refractory monolith or a plurality of distinct or discrete structures or particulates. An especially preferred Rh-Ln catalyst contains about 0.5–10 wt % Rh and about 0.5–10 wt % Sm on a refractory support, especially where the weight ratio of Rh to Sm is in the range of about 0.5–2. For example, an active SPOC™ catalyst is prepared by depositing Rh (e.g., 4–6 wt %) onto a layer of Sm (e.g., 3–6 wt %) that coats an alpha-alumina foam monolith, which contains about 45–80 pores per linear inch. Weight percent (wt %) refers to the amount of metal component relative to the total weight of the catalyst, including the support, if any. Suitable alpha-alumina monoliths are commercially available from Vesuvius Hi-Tech Ceramics Inc., Alfred Station, N.Y. Other monolith support structures or catalyst configurations include a disk with multiple perforations formed therethrough, a honeycomb-like structure, an etched foil and any other structure that provides the desired amount of transparency (i.e., non-resistance to the flow of gases) to permit the preferred 100 millisecond or less contact time, allowing the desired SPOX reaction to take place.

As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

The terms "discrete" or "divided" structures or units refer to catalysts or supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than ten millimeters, preferably less than five millimeters.

The term "monolith" refers to any singular piece of material of continuous manufacture such as solid pieces of metal or metal oxide or foam materials or honeycomb structures. Two or more such catalyst monoliths may be stacked in the catalyst zone of the reactor if desired. In any case, the catalyst device, system or particle bed has sufficient porosity, or sufficiently low resistance to gas flow, to permit a stream of said reactant gas mixture to pass over the catalyst at a gas hourly space velocity (GHSV) of at least about 20,000 hr$^{-1}$, preferably at least 100,000 hr$^{-1}$, when the reactor is operated to produce synthesis gas and elemental sulfur from a mixture of $H_2S$ and light hydrocarbon.

Pt—Rh Alloy. While many of the above-described catalyst compositions have demonstrated good activity for catalyzing the partial oxidation of $H_2S$ and the partial oxidation of light hydrocarbons, some metals, such as Rh, suffer from sulfur deactivation or poisoning with extended on stream exposure to $H_2S$-containing streams. This is due to the formation of sulfur deposits and/or metal sulfide formation that remove the active catalytic form. The surprising discovery was made that this problem is greatly improved or solved completely by combining platinum with rhodium in the catalyst. Without wishing to be bound by a particular theory, it appears that the Pt component enhances resistance of the Pt—Rh alloy catalyst to sulfur deactivation and the Rh component enhances its resistance to coking.

Pt—Rh Alloy on Ln-modified Refractory Support. An especially good catalyst that is highly stable and active for catalyzing both the direct partial oxidation of high concentrations of $H_2S$ in a gas stream to elemental sulfur and water and the partial oxidation of a light hydrocarbon to synthesis gas contains both platinum and rhodium supported on a samarium-modified refractory support, such as the above-described supports and materials. A highly preferred catalyst is prepared by depositing about 0.1%–6 wt % Pt onto about 3–6 wt % Rh, which was previously deposited onto an approximately 3–5 wt % lanthanide oxide, preferably samarium oxide, coated refractory support (wt % based on total weight of the supported catalyst). A preferred support is alumina granules, more preferably alpha-alumina. In the present investigations, the surprising synergy between the Pt and Rh components enhanced catalyst stability under both CPOX and SPOX reaction promoting conditions, and when further combined with a lanthanide or lanthanide oxide promoter provides an even better catalyst for syngas production and $H_2S$ conversion.

Catalyst stability refers to resistance to (a) deactivation due to carbon or sulfur deposition, (b) chemical reaction between sulfur and the catalytic components and (c) volatilization of precious metal at reaction conditions. For example, coke formation on the catalyst, or the formation of metal sulfide, may result in loss of activity for the SPOX reaction. Stability of the catalyst is typically reflected by consistent and reproducible catalytic performance (e.g., $S^0$ yield from the $H_2S$ feed or syngas yield from the light hydrocarbon feed, and selectivity for the desired $S^0$, $H_2O$, CO and $H_2$ products of the respective reactions).

The above-described Pt—Rh based catalysts are preferably in the form of either a wire gauze, a foam monolith, or in the form of a catalytically active material dispersed or deposited on a refractory support containing zirconia, α-alumina, cordierite, titania, mullite, zirconia-stabilized α-alumina, MgO stabilized zirconia, MgO stabilized alumina, niobia or a mixture of any of those materials, or another suitable refractory material (e.g., nitride or carbide compounds, such as silicon carbide or silicon nitride). Alumina is preferably in the form of alpha-alumina, however the other forms of alumina have also demonstrated satisfactory performance.

For example, the catalyst can be structured as, or supported on, a refractory oxide "honeycomb" straight channel extrudate or monolith, made of cordierite or mullite, or other configuration having longitudinal channels or passageways permitting high space velocities with a minimal pressure drop. Such configurations are known in the art and described, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst"), which is hereby incorporated herein by reference.

A more preferred catalyst geometry comprises granules prepared by impregnating or washcoating the catalytic components, or their precursors, onto lanthanide coated refractory granules, calcining and reducing the catalyst, using techniques that are well known in the art. A catalyst bed for a syngas production process may comprise a quantity of such impregnated or coated granules, or other forms of divided support such as beads, pills, pellets, cylinders, trilobes, extrudates, spheres, other rounded shapes or other manufactured configurations, or irregularly shaped particles. The divided support preferably comprises a refractory material, as described above.

The following examples are illustrative of certain embodiments of the present methods and compositions and are not intended to limit the scope of the claimed invention.

EXAMPLE 1

1% Pt, 5.1% Sm/α-Alumina

To an alpha-alumina foam (80 pores per inch, ⅝" L×½" D, 1.1015 grams), 0.1643 gram of Samarium nitrate (Aldrich 29,812-3) solution in 1.5 grams of distilled and deionized (DDI) water was added and dried at 70–80° C. for 2 hours on hotplate. After drying, it was calcined at 125° C. for 1 hour, 250° C. for 1 hour and 500° C. for 3 hours using a ramp rate of 3° C./min. To this Sm-oxide coated support, 0.0232 gram of Platinum tetrammine nitrate (Aldrich 48,229-3) solution in 1.5 grams of DDI water was added and dried at 70–80° C. for 2 hours on hotplate. After drying, it was calcined at 125° C. for 1 hour, 250° C. for 1 hour and 500° C. for 3 hours using a ramp rate of 3° C./min. The catalyst was reduced using a 1:1 N2:H2 mixture flowing at a total flowrate of 600 ml/min at 125° C. for 0.5 hour and 500° C. for 3 hours using a ramp rate of 3° C./min. The resulting catalyst composition was 1.09% Pt, 5.04% Sm based on the weight of the support.

EXAMPLE 2

4.2% Rh, 5.2% Sm/α-Alumina

To an alpha-alumina foam (80 pores per inch, ⅝" L×½" D, 1.1906 grams), 0.1817 gram of Samarium nitrate (Aldrich 29,812-3) solution in 1 gram of DDI water was added and dried at 70–80° C. for 2 hours on hotplate. After drying, it was calcined at 125° C. for 1 hour, 250° C. for 1 hour and 500° C. for 3 hours using a ramp rate of 3° C./min. To this Sm-oxide coated support, 0.1284 gram of Rhodium chloride (Aldrich 20,626-1) solution in 1 gram of DDI water was added and dried at 70–80° C. for 2 hours on hotplate. After drying, it was calcined at 125° C. for 1 hour, 250° C. for 1 hour and 500° C. for 3 hours using a ramp rate of 3° C./min. The catalyst was reduced using a 1:1 N2:H2 mixture flowing at a total flowrate of 600 ml/min at 125° C. for 0.5 hour and 500° C. for 3 hours using a ramp rate of 3° C./min. The resulting catalyst composition was 4.2% Rh, 5.2% Sm based on the weight of the support.

EXAMPLE 3

0.5% Pt, 4% Rh, 5.1% Sm/α-Alumina

To an alpha-alumina foam (80 pores per inch, ⅝" L×½" D, 1.2816 grams), 0.1933 gram of Samarium nitrate (Aldrich 29,812-3) solution in 1 gram of DDI water was added and dried at 70–80° C. for 2 hours on hotplate. After drying, it was calcined at 125° C. for 1 hour, 250° C. for 1 hour and 500° C. for 3 hours using a ramp rate of 3° C./min. To this Sm-oxide coated support, 0.1336 gram of Rhodium chloride (Aldrich 20,626-1) solution in 1 gram of DDI water was added and dried at 70–80° C. for 2 hours on hotplate. After drying, it was calcined at 125° C. for 1 hour, 250° C. for 1 hour and 500° C. for 3 hours using a ramp rate of 3° C./min. To this, a dilute solution of tetrammine platinum nitrate in DDI water was added and dried at 70–80° C. for 1 hour on hotplate. After drying, it was calcined at 250° C. for 3 hours using a ramp rate of 2° C./min. The catalyst was reduced using a 1:1 N2:H2 mixture flowing at a total flowrate of 600 ml/min at 125° C. for 0.5 hour and 500° C. for 3 hours using a ramp rate of 3° C./min. The resulting catalyst composition was 0.5% Pt, 4.2% Rh, 5.2% Sm based on the weight of the support.

EXAMPLE 4

(0.5% Pt, 5.1% Rh, 5.1% Sm)/α-Alumina Stacked on (0.5% Pt, 5.1% Rh, 5.1% Sm)/α-Alumina Two 80 pores per inch, ⅝" L×½" D alpha-alumina foam-supported catalysts were prepared using the same sequence mentioned in Example 3, but with resulting identical compositions of 0.5% Pt, 5.1% Rh, 5.1% Sm and stacked together to get an 1¼" long catalyst bed.

EXAMPLE 5

(0.5% Pt, 4% Rh, 4.8% Sm)/α-Alumina Stacked on (0.5% Pt, 4% Rh, 4.8% Sm)/α-Alumina Two 80 pores per inch, ⅝" L×½" D alpha-alumina foam-supported catalysts were prepared using the same sequence mentioned in Example 3, with resulting identical compositions of 0.5% Pt, 4% Rh, 4.8% Sm and stacked together to get an 1¼" long catalyst bed.

EXAMPLE 6

(0.5% Pt, 4.7% Rh)/α-Alumina Stacked on (0.5% Pt, 4.8% Rh)/α-Alumina

Two 80 pores per inch, ⅝" L×½" D alpha-alumina foam-supported catalysts were prepared using the same sequence mentioned in Example 3 except for the Sm-oxide coating step, with resulting compositions of 0.5% Pt, 4.7% Rh and 0.5% Pt, 4.8% Rh, and stacked together to get an 1¼" long catalyst bed.

EXAMPLE 7

(3% Pt, 3.9% Rh, 4.8% Sm)/α-Alumina Stacked on (2% Pt, 3.8% Rh, 4.6% Sm)/α-Alumina Stacked on (0.25% Pt, 4.3% Rh, 5.4% Sm)/α-Alumina Three 45 pores per inch, ⅝" L×½" D alpha-alumina foam-supported catalysts were prepared using the same sequence mentioned in Example 3, but with resulting compositions of 3% Pt, 3.9% Rh, 4.8% Sm, 2% Pt, 3.8% Rh, 4.6% Sm and 0.25% Pt, 4.3% Rh, 5.4% Sm, and stacked together in the order given, from top monolith to bottom monolith, to get an 1⅞" long catalyst bed.

Test Procedure for Evaluating Catalyst Performance

Representative catalysts were evaluated for their ability to catalyze the CPOX and SPOX reactions in a modified conventional flow apparatus using a quartz reactor with a length of 12 inches, an outside diameter of 19 mm and an inside diameter of 13 mm. Ceramic foam pieces of 99% Al₂O₃ (12 mm outside diameter×5 mm thick, with 45 pores per linear inch) were placed before and after the catalyst as radiation shields. The catalyst bed including the radiation shields was approximately 12 mm in diameter×8 cm in height. The inlet radiation shield also aided in uniform distribution of the feed gases. An Inconel™-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The runs were conducted at a volumetric oxygen to methane ratio of 0.5–0.75, a preheat temperature of 325–350° C., and a combined flow rate of 4,000–8,000 cc/min (4–8 standard liters per minute (SLPM)), corresponding to a gas hourly space velocity (GHSV) of about 700,000–4,000,000 $hr^{-1}$, and at a pressure of 5 psig (136 kPa). The reactor effluent was analyzed using a gas chromatograph equipped with a thermal conductivity detector. The data reported in Table 1 were obtained after approximately 1 hour on stream at the specified conditions. It can be seen that the catalyst was stable under very high GHSV and varying fuel/oxygen ratios. Because the GC data analysis method was primed for SPOX reaction products and not syngas products, the data cannot be directly interpreted to calculate syngas performance. $H_2$:CO ratio is a useful parameter when comparing the quality of syngas obtained, and a value close to 2 is considered ideal for use of this syngas in Fischer-Tropsch or Methanol synthesis processes. As shown in Table 1, the catalysts show $H_2$:CO ratio of about 1.8, which is comparable to that from a methane partial oxidation system. It must be added that the ratio is not affected by testing the same catalyst under SPOX conditions and reverting back to syngas test conditions.

When the various Pt—Sm/$Al_2O_3$, Rh—Sm/$Al_2O_3$, and Pt—Rh—Sm/$Al_2O_3$ compositions of Examples 1–5 and 7 were tested for their ability to catalyze the direct oxidation of $H_2S$ to S (without the presence of methane in the feed gas mixture), the Pt—Rh—Sm combination demonstrated longer catalyst life compared to the samples containing only Pt—Sm or Rh—Sm, as shown in Table 2. Catalyst life was primarily determined by the catalyst's resistance to deactivation due to coking or plugging by sulfide formation. These tests also showed a loss of catalyst performance when Sm was absent from the catalyst composition (Example 6). Without wishing to be limited to a particular theory, it is believed that Sm deters solid reaction of the catalytic metals and the support material. For example, it is thought that Sm deters formation of metal aluminate compounds from the solid reaction of the Pt and/or Rh with the alumina support at SPOX reaction temperatures. The presence of Sm in the support also improves the surface area (i.e., dispersion) of the Pt and/or Rh. The latter property is believed to cause the improved $S^0$ yield during the SPOC™ process. It was also observed that the addition of Sm to the support prior to application of the active metals lowered the reaction initiation (i.e., light off) temperature. In the present series of tests, contact times of 9 milliseconds and less were obtained. In one instance, a 2 millisecond contact time was obtained under the stated reaction conditions.

While a smaller catalyst bed length/diameter ratio is generally preferred for syngas production in a CPOX process, it was unexpected that improved performance under these test conditions (for Tables 1 and 2) was obtained when the catalyst bed length was longer (i.e., 1¼ inch/3.2 cm) compared to the ⅝ inch/1.6 cm bed length). Without wishing to be limited to a particular theory, it is thought that the $H_2S$ catalytic partial oxidation reaction zone is more mobile within the catalyst bed than the syngas reaction with the same catalyst bed density and packing configuration, and hence a longer catalyst bed acts as a cushion to handle higher flow rates even though the reaction occurs primarily on the front end of the catalyst bed similar to the syngas catalytic partial oxidation reaction. It is thought that the longer catalyst beds and hence longer contact times provide the flexibility of using gas flow rates over a wide range. It is also possible that the longer catalyst beds help with a more gradual heat transfer rate.

Operating a syngas/sulfur recovery process at shorter contact times makes it possible to use smaller reactors and hence incur less capital cost than is presently possible with conventional processes. Even using the longer catalyst beds described above, which provide still better productivity, the increased bed length of the reactor is not so great as to increase the capital cost significantly. Moreover, as discussed above, the additional catalyst bed length provides the flexibility to handle high or low flow rates without changing the catalyst bed, which is an advantage in terms of unit uptime. It must be noted that shorter catalyst beds can be used efficiently under SPOX conditions by designing suitable bed packing, thus combining the advantages shown above with a shorter catalyst bed.

TABLE 1

CATALYST PERFORMANCE FOR SYNGAS PRODUCTION

| EX. | Composition | Catalyst bed length | $O_2/CH_4$ ratio | $CH_4$ flowrate (ml/min) | Air flowrate (ml/min) | Total gas flowrate (ml/min) | GHSV (1/hour) | CO mole % from GC*** | $H_2$ mole % from GC*** | $N_2$ mole % from GC*** | $H_2$:CO ratio*** |
|---|---|---|---|---|---|---|---|---|---|---|---|
| 1 | 1% Pt, 5.1% Sm* | ⅝" | 0.51 | 1992 | 4795 | 6787 | 3.32 MM | 20.55 | 23.63 | 44.87 | 1.2 |
| 2 | 4.2% Rh, 5.2% Sm* | ⅝" | 0.50 | 2195 | 5266 | 7461 | 3.65 MM | 21.83 | 26.02 | 42.54 | 1.2 |
| 4 | (0.5% Pt, 5.1% Rh, 5.1% Sm)/(0.5% Pt, 5.1% Rh, 5.1% Sm)* | 1¼" | 0.72 | 1006 | 3430 | 4436 | 1.08 MM | 16.06 | 27.21 | 46.69 | 1.7 |
| 5 | (0.5% Pt, 4% Rh, 4.8% Sm)/(0.5% Pt, 4% Rh, 4.8% Sm)* | 1¼" | 0.72 | 1005 | 3427 | 4432 | 1.08 MM | 15.35 | 26.87 | 46.82 | 1.8 |

TABLE 1-continued

CATALYST PERFORMANCE FOR SYNGAS PRODUCTION

| EX. | Composition | Catalyst bed length | $O_2/CH_4$ ratio | $CH_4$ flowrate (ml/min) | Air flowrate (ml/min) | Total gas flowrate (ml/min) | GHSV (1/hour) | CO mole % from GC*** | $H_2$ mole % from GC*** | $N_2$ mole % from GC*** | $H_2$:CO ratio*** |
|---|---|---|---|---|---|---|---|---|---|---|---|
| 6 | (0.5% Pt, 4.7% Rh)/(0.5% Pt, 4.8% Rh)* | 1¼" | 0.72 | 1005 | 3426 | 4431 | 1.08 MM | 16.14 | 26.15 | 48.18 | 1.6 |
| 7 | (3% Pt, 3.9% Rh, 4.8% Sm)/(2% Pt, 3.8% Rh, 4.6% Sm)/(0.25% Pt, 4.3% Rh, 5.4% Sm)** | 1⅞" | 0.72 | 1006 | 3427 | 4433 | 0.72 MM | 14.08 | 19.75 | 52.45 | 1.4 |

*On 80-ppi alpha-alumina foam support, each ⅝" L × ½" D, at a feed preheat temperature of 650° F.
**On 45-ppi alpha-alumina foam support, each ⅝" L × ½" D, at a feed preheat temperature of 650° F.
***That the GC method was set up for SPOX reaction data and not syngas reaction data. Hence the reported CO, $H_2$ and $N_2$ GC mole % numbers are meant to indicate the improving trend in terms of $H_2$:CO ratio and not the absolute values for methane conversion and syngas selectivity.

TABLE 2

CATALYST PERFORMANCE FOR SPOC™ REACTION

| EX. | Composition | Catalyst bed length | Air/$H_2S$ ratio | $H_2S$ flowrate (ml/min) | Air flowrate (ml/min) | Total gas flowrate (ml/min) | GHSV (1/hour) | $H_2S$ conversion (%) | S yield (%) | $SO_2$ yield (%) | Catalyst Life |
|---|---|---|---|---|---|---|---|---|---|---|---|
| 1 | 1% Pt, 5.1% Sm* | ⅝" | 2.00 | 1998 | 3987 | 5985 | 2.93 MM | 77.1 | 70 | 7.1 | 2 hr (coked) |
| 2 | 4.2% Rh, 5.2% Sm* | ⅝" | 2.39 | 1995 | 4768 | 6763 | 3.31 MM | 82.2 | 69.4 | 12.9 | 2 hr (Sulfide plugged) |
| 3 | 0.5% Pt, 4% Rh, 5.1% Sm* | ⅝" | 2.39 | 760 | 1820 | 2580 | 1.26 MM | 80.8 | 70.1 | 10.7 | 10 hr (no deactivation) |
| 4 | (0.5% Pt, 5.1% Rh, 5.1% Sm)/(0.5% Pt, 5.1% Rh, 5.1% Sm)* | 1¼" | 2.30 | 861 | 1978 | 2839 | 0.694 MM | 82 | 72.5 | 9.5 | 18 hr (No deactivation) |
| 5 | (0.5% Pt, 4% Rh, 4.8% Sm,)/(0.5% Pt, 4% Rh, 4.8% Sm)* | 1¼" | 2.22 | 966 | 2146 | 3112 | 0.761 MM | 82.2 | 72.4 | 9.8 | No deactivation |
| 6 | (0.5% Pt, 4.7% Rh)/(0.5% Pt, 4.8% Rh)* | 1¼" | 2.29 | 759 | 1736 | 2495 | 0.610 MM | 79.5 | 68.8 | 10.7 | No deactivation |
| 7 | (3% Pt, 3.9% Rh, 4.8% Sm)/(2% Pt, 3.8% Rh, 4.6% Sm)/(0.25% Pt, 4.3% Rh, 5.4% Sm)** | 1⅞" | 2.26 | 969 | 2191 | 3160 | 0.515 MM | 81.3 | 71.2 | 10.1 | No deactivation |

*On 80-ppi alpha-alumina foam support, each ⅝" L × ½" D, at a feed preheat temperature of 650° F.
**On 45-ppi alpha-alumina foam support, each ⅝" L × ½" D, at a feed preheat temperature of 650° F.

Process for SPOC™ Enhanced Production of Synthesis Gas

In a preferred mode of operation of the reactor and assembly shown in FIGS. 1 and 2, a stream of light hydrocarbon, such as methane, is fed into feed injection opening 12. A stream of $H_2S$ is fed into a second feed injection opening 14. Air or oxygen is fed into the third feed injection opening 16, which is preferably positioned close to catalyst 24. It should be understood that the feed injection openings could be configured differently from the configuration shown in FIG. 1 without affecting the principles or operation of the present system. For example, $O_2$ injection opening 16 could be positioned such that the oxygen is mixed with the light hydrocarbon during the contacting of the feed gas stream with a hot catalyst. Such a configuration may help reduce the occurrence of unwanted side reactions that might otherwise rapidly occur during or after mixing of $O_2$ with the $H_2S$ and hydrocarbon components but prior to contacting the catalytic surfaces of the reaction zone. Also, the hydrocarbon and $H_2S$ injection openings 12 and 14, respectively, could be switched, or the manner of mixing the gases could be modified. In an alternative feed injection configuration, the hydrocarbon feed stream may initially include an amount of $H_2S$ instead of requiring a separate $H_2S$ injection feed. For example, a feed obtained directly from a natural gas reservoir may contain a trace amount of $H_2S$, a small amount (e.g., 0.5–1 vol. %), 3–25 vol. %, or even up to about 70 vol. % hydrogen sulfide. In this case the separate $H_2S$ feed stream is either omitted entirely or the amount of $H_2S$ added from an external source via injection opening 14 is regulated so as to maintain a favorable molar ratio of $H_2S$ to $CH_4$, as discussed in more detail below. In either alternative, oxygen injected via inlet 16, is preferably mixed with the hydrocarbon-$H_2S$ gas feed immediately before contacting the feed gases with the catalyst. Air, or a mixture of air and oxygen can be substituted for the pure oxygen. However, since the presence of $N_2$ in the reactant gas mixture can be problematic (e.g., forming unwanted nitrogen-containing compounds), it is usually preferable to use pure oxygen instead of air.

As the feed gases from feed injection openings 12, 16 and, optionally, 14 flow toward catalytic device 24, they are subjected to thorough mixing by static mixer 18, which can be simply a series of vanes that extend into the flow path of the reactant gas mixture. During mixing, the feed gases are shielded by radiation barrier 22 from radiant heat that is generated downstream in the process. It is preferred that the temperature on the upstream side of barrier 22 be in the range of about 20° C. to about 200° C., and no more than about 500° C. Preheating the feed gases above about 300° C. is generally not desirable because excessive heat can cause unwanted homogeneous reactions to occur that reduce the selectivity of the process for the desired CO, $H_2$, elemental sulfur and water products, and also poses safety hazards. It has been observed in the present studies that feed gas temperatures up to about 200° C. tend to help initiate both the CPOX and SPOX reactions. In some instances, it may also be desirable to briefly supplement the hydrocarbon feed with propane or another pure, readily oxidizable hydrocarbon to facilitate rapid initiation of the CPOX reaction. Preferably the catalyst is not exposed to $H_2S$ before a catalyst temperature above about 500° C. has been reached, in order to deter catalyst deactivation by chemical or physical interaction of sulfur with the catalytically active sites. It is highly preferred that there be a minimum of void or dead spaces in the areas of the reactor that are occupied by the mixing reactant gas in order to minimize the opportunity for gas stagnation and undesirable combustion reactions to occur before the reactant gas stream comes into contact with hot catalyst.

After the gases pass barrier 22, they flow past catalytic device 24 and are simultaneously heated to more than 500° C., preferably between 700° C. and about 1,500° C., more preferably 850° C.–1,300° C.

The gas flow rate is preferably maintained such that the contact time for the portion of the gas that contacts the catalyst is no more than about 100 milliseconds. For some purposes is desirable to manage the flow rate such that a contact time under 50 milliseconds, under 20 milliseconds or even less is obtained. This degree of contact produces a favorable balance between competing reactions and produces sufficient heat to maintain the catalyst at the desired temperature. The SPOC™ process is carried out in which elemental sulfur is produced by catalyzed partial oxidation (SPOX) according to equation (3):

$$H_2S + \tfrac{1}{2}O_2 \rightarrow 1/x\, S_x + H_2O \qquad (3)$$

where x equals 2, 6, or 8, with x=2 being the most likely. At the same time exposure to the hot catalyst and oxygen partially oxidizes the light hydrocarbons in the feed according to the CPOX reaction (using methane as a representative light hydrocarbon):

$$CH_4 + \tfrac{1}{2}O_2 \rightarrow CO + 2H_2 \qquad (4)$$

Both reactions are catalyzed in the same reaction zone, preferably on the same catalyst.

Regardless of whether $H_2S$ is added to the light hydrocarbon via a separate stream, or whether all or part of the $H_2S$ is included in the light hydrocarbon feed stream, it is preferred to keep the stoichiometric molar ratio of $H_2S:CH_4$ in the feed gas mixture at about 1:10 to 2:3, and it is preferred to keep the stoichiometric molar ratio of carbon:oxygen at about 1.5:1 to 2.2:1, to favor the concurrent CPOX and SPOX reactions. This is best accomplished by monitoring and adjusting during operation the composition, temperature, and flow rates of the feed gases, as further described below. By establishing and maintaining reaction conditions favoring SPOX over the hydrocarbon combustion reaction of equation (2), the conversion of the carbon atoms contained in the hydrocarbon molecules to $CO_2$ is preferably restricted to less than 10 vol. %. In this way the $CO_2$ content of the product gases is minimized and the selectivity for CO and $H_2$ products is enhanced compared to what is usually obtainable with conventional CPOX syngas generation processes.

In many cases it is helpful to heat the catalytic device 24 using external means at least at the start of the process, so as to initiate the exothermic reactions on the catalyst structure. Once the system is running, it is preferably run adiabatically or nearly adiabatically (i.e., without loss of heat), so as to reduce the formation of carbon (e.g., coke) on the surface of the gauze catalyst. Preferably the catalyst structure is heated sufficiently as a result of the exothermic chemical reactions occurring at its surface to perpetuate the CPOX and SPOX reactions under favorable conditions of reactant gas molar ratios and catalyst contact time. Heating by external means can allow for increases in the rate at which feed gas can be passed through the catalyst structure while still obtaining desirable reaction products.

The rate of feed of $H_2S$ into the system is preferably controlled and adjusted so that the heat generated by the oxidation of the $H_2S$ is sufficient to maintain the desired temperature in reaction zone 20 and thus reduce the amount of the light hydrocarbon that is completely combusted. Hence, the mole ratio of $H_2S$ to carbon in the feed is preferably in the range of from about 1:10 to about 2:3. When the light hydrocarbon is methane, a preferred ratio of $H_2S$ to methane is 2:3.

When referring to a wire gauze catalyst, the contact time may be calculated as the wire diameter divided by the feed gas stream velocity at inlet conditions (i.e., temperature and pressure at the inlet to the reactor). When employing a catalyst monolith or packed bed of divided catalyst, the surface area, depth of the catalyst bed, and gas flow rate (space velocity) are preferably adjusted to ensure the desired short contact time (e.g., less than 100 milliseconds, under 50 milliseconds, under 20 milliseconds, or 10 milliseconds or less). It is well known that contact time is inversely proportional to the "space velocity," as that term is customarily used in chemical process descriptions, and is typically expressed as volumetric gas hourly space velocity in units of $hr^{-1}$. The most preferred of the above-described catalysts or catalyst beds have sufficient porosity, or sufficiently low resistance to gas flow, to permit the flow of reactant gases over the catalyst at a gas hourly space velocity (GHSV) of at least about 20,000 $hr^{-1}$, which corresponds to a weight hourly space velocity (WHSV) of about 200 $hr^{-1}$. Preferably the reactor-sulfur condenser assembly is operated at a reactant gas pressure greater than 1 atmosphere (about 100 kPa), more preferably above 2 atmospheres, which is advantageous for optimizing syngas production space-time yields.

Referring to FIG. 2, from reaction zone 20, the reacted gases are rapidly cooled in cooling zone 30, preferably entering a heat exchanger such as firetube boiler 40, where they are cooled to below 450° C., and preferably to below 340° C. The heat removed from the partially oxidized gases can be recaptured in steam heating or the like. The rapid cooling that occurs in the boiler drops the temperature of the reacted gases to below about 450° C. and thus ceases the CPOX and SPOX reactions.

The cooled, partially oxidized gases flow from boiler 40 into condenser 50, where they are cooled further until the dew point of the elemental sulfur is reached. This allows for the removal of elemental sulfur, as desired, from the process. Once the bulk of the elemental sulfur is removed, the partially oxidized gases are reheated in heater 55 and passed through a tail gas converter unit 60. More specifically, in each converter unit 60, the hot gas stream is passed over a bed of sulfur absorbing material such as zinc or iron oxide. In this bed, any elemental sulfur is converted to metal sulfide and retained in the bed. The effluent from the sulfur absorber is then preferably cooled sufficiently to condense the bulk of any remaining water from the gas stream. The synthesis gas, which is substantially free of sulfur-containing gases, is recovered and may be fed directly into another process such as a methanol generation plant or a Fischer-Tropsch operation.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, the mixing process can be altered or replaced with an active mixer, the thermal barrier can be modified, the structure and composition of the catalyst can be varied, and the tail gas treatment steps can be modified. Also, it can be readily appreciated that a conventional catalytic partial oxidation process for preparing synthesis gas may be improved to provide better syngas yield and selectivity for CO and $H_2$ products by applying the above-described methods and catalysts and making appropriate additions and modifications of presently available short contact time reactors.

Accordingly, the scope of protection is not limited by the description set out above, but is only limited by the claims which follow, that scope including all equivalents of the subject matter of the claims. Use of the term "optionally" with respect to any element of a claim is intended to mean that the subject element is required, or alternatively, is not required. Both alternatives are intended to be within the scope of the claim. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A process for producing synthesis gas comprising:
    passing a gaseous mixture comprising $H_2S$, light hydrocarbon and $O_2$ over a catalyst in the reaction zone of a reactor, said catalyst having activity for catalyzing the partial oxidation of said hydrocarbon to a product comprising CO and $H_2$ and also having activity for catalyzing the partial oxidation of $H_2S$ to elemental sulfur and water, said gaseous mixture comprising a $H_2S$:C molar ratio of about 1:10 to about 2:3;
    maintaining reaction promoting conditions such that the direct partial oxidation of $H_2S$ to elemental sulfur and water, and the partial oxidation of the light hydrocarbon to carbon monoxide and hydrogen occur and a process gas stream is obtained comprising CO, $H_2$, gaseous elemental sulfur and steam; and
    condensing elemental sulfur from said process gas stream to provide a sulfur depleted synthesis gas stream.

2. The process of claim 1 comprising:
    providing a first gas stream comprising at least one light hydrocarbon;
    providing a second gas stream containing $H_2S$;
    providing a third gas stream comprising air or $O_2$;
    mixing said first, second and third gas streams to provide a feed gas stream;
    contacting said catalyst with said feed gas stream at a temperature in the range of about 900° C. to about 1300° C.;
    passing said feed gas stream over said catalyst at such flow rate that the contact time for a portion of said feed gas that contacts said catalyst is no more than about 10 milliseconds;
    cooling said gaseous product stream to the dew point of elemental sulfur such that elemental sulfur condenses from said product stream and an at least partially desulfurized gaseous product stream is obtained;
    optionally, recovering elemental sulfur product;
    optionally, removing a residual gaseous sulfur-containing component from said at least partially desulfurized gaseous product stream; and
    recovering synthesis gas from said product stream.

3. The process of claim 2 comprising a catalyst/feed gas contact time of less than 5 milliseconds.

4. The process of claim 3 comprising a catalyst/feed gas contact time of less than about 2 milliseconds.

5. The process of claim 1 wherein said gaseous mixture comprises a $CH_4:O_2$ molar ratio of about 1.5:1 to about 2.2:1.

6. The method according to claim 1 wherein said reactant gas stream contacts said catalyst at a catalyst temperature of at least about 400° C.

7. The method of claim 6 wherein said temperature is in the range of about 700° C.–1,500° C.

8. The method of claim 7 wherein said temperature is in the range of 850° C.–1,300° C.

9. The method of claim 1 wherein less than 10% of the carbon in said light hydrocarbon is converted to carbon dioxide.

10. The method of claim 1 wherein the catalyst contact time is no more than 100 milliseconds.

11. The method of claim 1 wherein the catalyst contact time is less than 50 milliseconds.

12. The method of claim 11 wherein the catalyst contact time is less than 20 milliseconds.

13. The method of claim 1 wherein said catalyst comprises at least one metal chosen from the group consisting of platinum, rhodium, ruthenium, iridium, nickel, palladium, iron, cobalt, rhenium and rubidium.

14. The method of claim 13 wherein said catalyst comprises platinum, rhodium or a mixture thereof.

15. The method of claim 1 wherein said catalyst comprises vanadium, bismuth or magnesium.

16. The method of claim 1 wherein said catalyst comprises at least one lanthanide element chosen from the group consisting of La, Ce, Pr, Nd, Pm, Sm, Eu, Gd, Th, Dy, Ho, Er, Tm, Yb and Lu.

17. The method of claim 16 wherein at least one said lanthanide element is samarium, ytterbium or praseodymium.

18. The method of claim 1 wherein said catalyst comprises platinum and at least one of cerium oxide or lanthanum oxide.

19. The method of claim 1 wherein said catalyst comprises rhodium and samarium oxide.

20. The method of claim 1 wherein said catalyst comprises a platinum-rhodium alloy disposed on a lanthanide oxide coated refractory support.

21. The method of claim 20 wherein said lanthanide oxide comprises samarium oxide.

22. The method of claim 1 wherein said catalyst comprises at least one structure chosen from the group consisting of gauzes, monoliths and a plurality of divided units.

23. The method of claim 22 wherein said divided units comprise particles, granules, beads, pills, pellets, cylinders, trilobes, extrudates or spheres.

24. The method of claim 22 wherein said structure comprises a refractory support.

25. The method of claim 24 wherein said support comprises a refractory material chosen from zirconia, alumina, silicon carbide and silicon nitride.

26. A system for producing synthesis gas and elemental sulfur, said system comprising:
   a light hydrocarbon inlet;
   optionally, an $H_2S$ inlet;
   an oxygen inlet;
   a mixing zone capable of receiving said light hydrocarbon, $H_2S$ and oxygen gases and forming a reactant gas mixture;
   a reaction zone capable of receiving said reactant gas mixture and containing a catalyst capable of catalyzing the partial oxidation of said hydrocarbon to form CO and $H_2$ and capable of catalyzing the partial oxidation of said $H_2S$ to form elemental sulfur and water;
   a process gas outlet in fluid communication with a cooling zone for receiving and cooling hot process gas, said cooling zone comprising a sulfur condenser; and
   a thermally protective joint between said process gas outlet and said cooling zone.

27. The system of claim 26 comprising a thermal barrier disposed between said mixing zone and said reaction zone.

28. The system of claim 26 comprising at least one tail gas processing unit downstream from said cooling zone.

29. The process of claim 1 performed in the system of claim 26.

30. A process for producing synthesis gas comprising:
   passing a gaseous mixture comprising $H_2S$, light hydrocarbon and $O_2$ over a catalyst in the reaction zone of a reactor, said catalyst having activity for catalyzing the partial oxidation of said hydrocarbon to a product comprising CO and $H_2$ and also having activity for catalyzing the partial oxidation of $H_2S$ to elemental sulfur and water, said gaseous mixture comprising a $H_2S$:C molar ratio of about 1:20 to about 2:3;
   maintaining reaction promoting conditions such that the direct partial oxidation of $H_2S$ to elemental sulfur and water, and the partial oxidation of the light hydrocarbon to carbon monoxide and hydrogen occur and a process gas stream is obtained comprising CO, $H_2$, gaseous elemental sulfur and steam; and
   condensing elemental sulfur from said process gas stream to provide a sulfur depleted synthesis gas stream.

31. The process of claim 30 comprising passing said gas mixture over said catalyst at a flow rate in excess of 20,000 $hr^{-1}$.

32. The process of claim 30 comprising passing said gas mixture over said catalyst at a pressure greater than 1 atmosphere.

33. In a short contact time process for producing synthesis gas comprising the catalytic partial oxidation of a light hydrocarbon wherein a portion of the hydrocarbon tends to combust to form $CO_2$, the improvement comprising substituting $H_2S$ partial oxidation for at least a portion of said hydrocarbon combustion in said process, whereby sufficient heat of reaction from said $H_2S$ partial oxidation is supplied to sustain said catalytic partial oxidation of said light hydrocarbon, and the amount of $CO_2$ in the resulting synthesis gas product is decreased.

34. A process for producing synthesis gas comprising:
   step for forming a reactant gas mixture comprising $H_2S$, $C_1$–$C_5$, hydrocarbon and $O_2$;
   step for catalyzing the partial oxidation of said hydrocarbon and the partial oxidation of said $H_2S$ to farm a process gas comprising CO, $H_2$, elemental sulfur and water;
   step for sustaining said partial oxidation of said hydrocarbon;
   step for condensing elemental sulfur from said process gas to provide a sulfur depleted synthesis gas stream and liquid elemental sulfur:
   step for recovering said liquid sulfur.

35. An apparatus for producing synthesis gas containing a reduced amount of $CO_2$, the apparatus comprising:
   means for forming a reactant gas mixture comprising $H_2S$, $C_1$–C5 hydrocarbon and $O_2$;
   means for catalyzing the partial oxidation of said hydrocarbon and the partial oxidation of said $H_2S$ to form a process gas comprising CO, $H_2$, elemental sulfur and water;
   means for cooling said process gas to a temperature above the dewpoint of elemental sulfur, to provide a cooled process gas;
   means for condensing elemental sulfur from said cooled process gas to provide a sulfur depleted synthesis gas stream and liquid elemental sulfur;
   means for recovering said liquid sulfur;
   means for removing residual sulfur from said sulfur depleted synthesis gas stream.

* * * * *